April 6, 1965  V. H. ASKE  3,176,520
ANGULAR ACCELEROMETER
Filed Sept. 12, 1960
FIG. 1
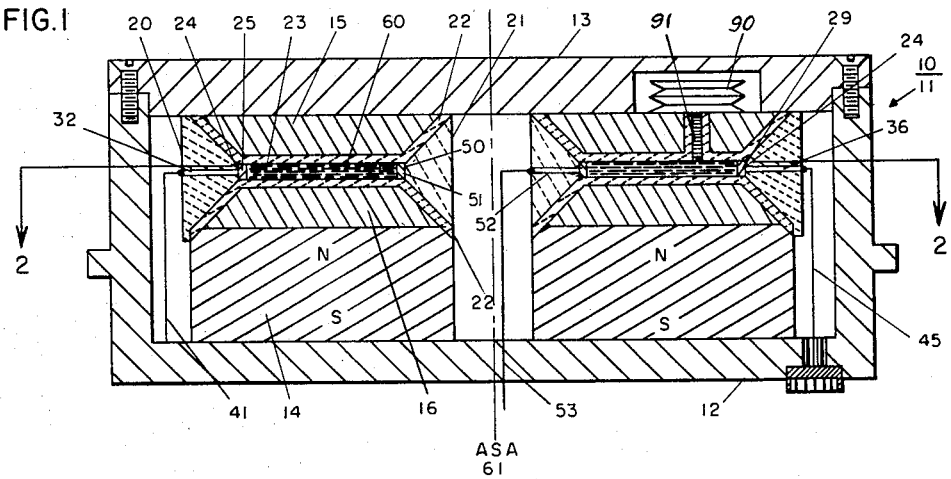
FIG. 2
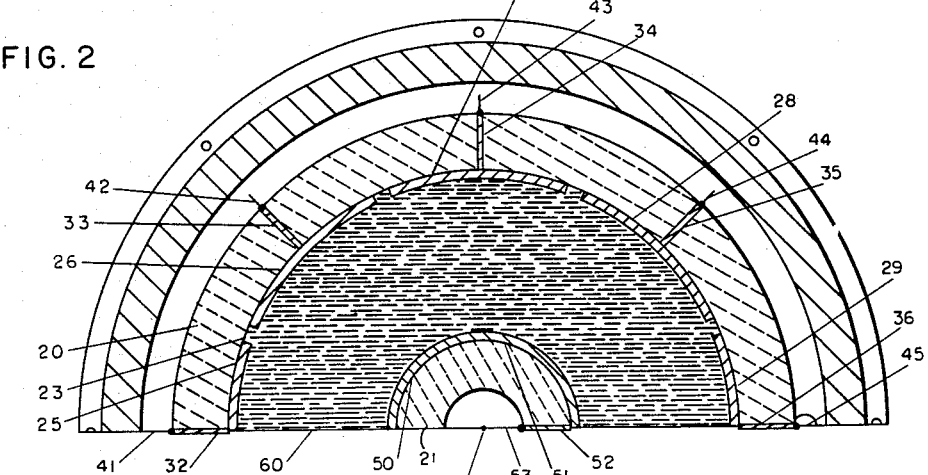
FIG. 3
FIG. 4
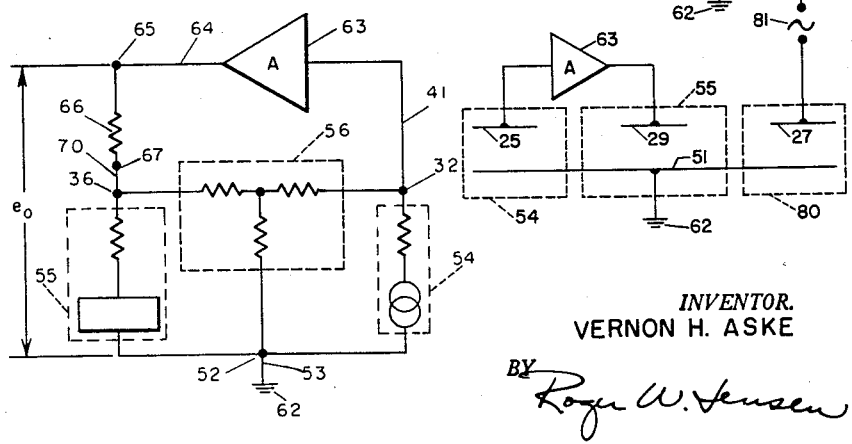
INVENTOR.
VERNON H. ASKE
BY
Roger W. Jensen United States Patent Office 3,176,520
Patented Apr. 6, 1965

3,176,520
ANGULAR ACCELEROMETER
Vernon H. Aske, Hopkins, Minn., assignor to Honeywell Inc., a corporation of Delaware
Filed Sept. 12, 1960, Ser. No. 55,484
13 Claims. (Cl. 73—516)

This invention pertains to motion sensing apparatus and more particularly to angular accelerometers.

There are many different variations of prior art angular accelerometers, the majority of which are of the classical type, that is, a rigid seismic mass element suspended from the accelerometer case by mechanical means such as a spring for movement relative the case. This type of accelerometer has a number of inherent disadvantages and in more recent years, angular accelerometers have been developed utilizing a fluid as the seimic mass. Among the advantages of the fluid type angular accelerometers are: (1) substantially no elastic restraint acting on the seismic mass, (2) no force acting on the seismic mass at its null position, (3) no sensitivity to linear accelerations.

In Patent 2,753,469 to L. D. Statham et al. there is disclosed and claimed an angular accelerometer utilizing a fluid as the seismic mass. In the Statham patent an annular ring of mercury or similar conductive fluid functions as the seismic mass. The movement of the conductive fluid in the presence of a magnetic flux field causes a voltage to be generated across the fluid which is, according to the Statham patent proportional to the applied angular acceleration. The angular accelerometer disclosed in the Statham patent is referred to by those skilled in the art as an "open loop" type of device.

The instant invention also utilizes a fluid as the seismic mass element of an angular accelerometer, however, the accelerometer is a "closed loop" type of device and as such, it is a vast improvement over the Statham device and other prior art devices. The instant invention utilizes an annular ring of conductive fluid as the seismic mass element which is displaced relative to the accelerometer case upon the application of an angular acceleration. The relative movement of the conductive fluid in the presence of a magnetic flux field generates a voltage which is sensed by suitable pick-off means, amplified, and applied across an output means and a torquer means; the torquer means applies a rebalancing force on the conductive liquid tending to oppose the relative movement thereof. It will be understood that the voltage applied across the torquer means is indicative of the applied angular acceleration. It should be pointed out that the construction of this unique angular accelerometer is based on a greatly simplified design compared to prior art devices.

The advantages of a closed-loop type of device over the open-loop type of device are many. One of the more important advantages is that the linearity of a closed-loop device is dependent only on the elements in the feedback loop. By virtue of the precision components contained in the feedback loop of the instant invention the linearity is very precise. In contrast, the linearity of an open-loop type of device is dependent upon the elements in the "forward" loop which are usually signal generators and amplifiers which normally do not have comparable precision. In addition, it can be shown mathematically that the closed-loop device more directly measures the input acceleration and is not dependent upon other rebalance forces. Further, the closed-loop concept is also a more flexible system, since the output scalings can be altered by altering the values of the components in the feedback loop.

One of the sources of error in the Statham type of device is in the viscous restraint of the seismic mass as the accelerometer is subjected to angular accelerations. The output signal is proportional to the velocity of the seismic mass and it is clear, therefore, that with continued acceleration the viscous restraint will have a greater effect on the velocity of the seismic mass. Since it is impossible to separate out the effects of the viscous restraint, errors are introduced in the output signal.

The instant invention utilizes a closed-loop design which allows a rebalancing force to be applied to the seismic mass through the feedback loop. The application of the rebalancing force to the conductive fluid reduces the errors due to viscous restraint of the fluid to a negligible value and gives much greater accuracy than the prior art devices.

It is a general object of this invention to provide an improved control apparatus.

It is another object of this invention to provide an improved angular accelerometer.

It is a further object of this invention to provide an angular accelerometer utilizing an annular ring of conductive fluid as a seismic mass which generates a voltage upon relative movement in the magnetic flux field in which it is located; this voltage being utilized to apply a rebalancing force upon the seismic mass tending to oppose its relative movement.

These and other objects of the invention will become apparent from a study of the accompanying specification and claims in conjunction with the accompanying drawings in which:

FIGURE 1 is a cross section of the angular accelerometer means;

FIGURE 2 is a partial cross section of the accelerometer means of FIGURE 1 as viewed along section lines 2—2;

FIGURE 3 is a schematic diagram of the electrical connections of the accelerometer means of FIGURES 1 and 2; and FIGURE 4 is a schematic diagram of the electrical connections of the contact means of FIGURES 1 and 2.

Referring to FIGURE 1, the reference numeral 10 generally depicts an accelerometer comprising in part a container or support means 11. More specifically, as shown in the drawing the container 11 takes the form of a hollow cylindrically shaped container having a cuplike portion 12 and a cover plate portion 13. In this configuration the container 11 will be made out of a suitable permeable material such as soft iron so as to have good magnetic flux carrying abilities. A suitable magnetic flux producing means is associated with the container 11. In the specific embodiment shown, the magnetic flux producing means takes the form of a permanent magnet 14 positioned within the container 11. The magnet 14 has an annular or ring-shaped configuration as shown, with the ring generally mounted on the bottom of the cuplike portion 12 of the container 11. The magnetic 14 is polarized so that the portion of the magnet adjacent to the bottom of the cuplike portion 12 is of one polarity while the other portion as shown in FIGURE 1 has the opposite polarity. For example, the top portion could have a north polarity as shown in FIGURE 1 and the portion adjacent to the bottom of the cuplike portion 12 could have a south polarity. A pair of pole piece members 15 and 16 are provided. The pole pieces 15 and 16 are annular in shape having substantially the same diameter as the permanent magnet 14. Pole piece 16 is attached to the permanent magnet 14 so as to form a pole face of the north pole thereof. Pole piece member 15 is attached or connected to the cover portion 13 in general register with pole piece 16. Generally the pole pieces 15 and 16 project toward one another and define a gap therebetween. Pole pieces 15 and 16 are tapered inwardly so as to concentrate the magnetic flux field which was established across the gap. Pole pieces 15 and 16 together, are referred to as a magnetic core structure. The complete magnetic circuit includes container 11, permanent magnet 14, pole pieces 15 and 16, and the gap. Pole pieces 15 and 16 are made out of a suitable permeable material such as soft iron which, as is well understood, will result in a uniform flux distribution thus assuring a uniform magnetic flux field in the gap. An insulator element 20 and an insulator element 21 are abutted against the pole pieces 15 and 16 on the opposite sides of the gap. The elements 20 and 21 are preferably bonded to the pole pieces 15 and 16 by use of a suitable insulative adhesive, such as "Solder Glass." The insulative adhesive is generally identified in FIGURE 1 by the reference numeral 22. As shown, the faces of pole pieces 15 and 16 adjacent to the gap are also coated with the insulative adhesive 22 so that any conductive material placed within the gap will be electrically insulated from the pole pieces 15 and 16.

Pole pieces 15 and 16, insulator element 20, and insulator element 21, collectively define a passage 23, it being understood that passage 23 is the aforesaid gap defined by the pole pieces 15 and 16 as further bounded by the inwardly extending faces of elements 20 and 21. The inner face 24 of the insulator element 20 has attached thereto or mounted thereon a plurality of contact means 25, 26, 27, 28, 29. Contacts 25, 26, 27, 28, and 29 may take different forms such as a separately fabricated contact element bonded by suitable means to the insulator element 20 or such as a contact film deposited by electrochemical techniques on the interface 24 of insulator element 20. As will be noted in FIGURE 2, the contact means 25, 26, 27, 28, and 29 are spaced about the inner periphery of insulator 20 and are insulated one from the other. Terminal means 32, 33, 34, 35, and 36 are provided for contact means 25, 26, 27, 28, and 29 respectively. Terminals 32, 33, 34, 35 and 36 are normally connected to the contact means by drilling a suitable bore through insulator element 20 and inserting the terminal means therein. Terminals 32, 33, 34, 35, and 36 are connected to leads 41, 42, 43, 44 and 45 respectively, for suitable electrical connections to be described later.

The inner face 50 of the insulator element 21 has attached thereto or mounted thereon contact means 51. Contact means 51 may take different forms such as a separately fabricated contact element bonded by suitable means to the insulator element 21 or such as a contact film deposited by electrochemical techniques on the inner face 50 of insulator 21. Contact means 51 may take the form of a plurality of independent contacts but for the sake of simplicity of illustration is shown as a single contact. As will be noted in FIGURE 2, the contact means 51 extends generally around the outer periphery of the insulator element 21 and around the inner periphery of passage 23. A suitable terminal means 52 is connected to contact means 51 in the manner previously described. Terminal 52 is connected to a lead 53, the electrical connection of which will be described later.

The plurality of contacts available can be utilized to provide suitable pickoff means, torquer means, and activation means as shown schematically in FIGURE 4. The combination of at least one of the contact means 25, 26, 27, 28, and 29, for example, contact means 25, in cooperation with contact means 51 will define a pickoff means 54. The combination of at least another of the contact means 25, 26, 27, 28, and 29, for example, contact means 29, in cooperation with the contact means 51 will define a torquer means 55. The combination of at least a third of contact means 25, 26, 27, 28, and 29, for example, contact means 27, in cooperation with contact means 51 will define an activation means 80. As shown in FIGURE 4, an alternating voltage will be applied from voltage source 81 to the activation means 80. In the embodiment shown, the voltage will be applied across contact means 27 and 51. This voltage will cause a current to flow between the contact means 27 and 51 through the seismic mass means 60 which will cause a force to be applied to the seismic mass means 60. This force will be applied to the seismic mass in one direction during one half cycle and in the reverse direction during the other one half cycle. This alternate application of the force, first in one direction and then in the reverse direction, causes the seismic mass 60 to oscillate and keeps it "alive" and permits very low threshold capabilities.

It should be understood that in other embodiments more than one of the plurality of contact means attached to conductor element 20 may be electrically connected together to cooperate with contact means 51 to form the pickoff means 54, torquer means 55, and activation means 80. In one embodiment, contact means 25 and 26 will be electrically connected together and in cooperation with contact means 51 will form the pickoff means 54; contact means 28 and 29 will be electrically connected together and in cooperation with contact means 51 will form torquer means 55; contact means 27 in cooperation with contact means 51 will form the activation means 80. It is clear that a number of various electrical connections, other than those described, are possible between the plurality of contact means.

A conductive seismic mass means 60 is positioned within and completely fills passage 23. In the specific embodiment shown, the conductive seismic mass means 60 takes the form on an annular ring of conductive liquid. Various substances may be used for the seismic mass such as, for example, mercury or sodium potassium (NaK). As shown in FIGURE 2, by completely filling the passage 23 with a conductive liquid 60, the conductive liquid is in engagement with contact means 25, 26, 27, 28, and 29 and contact means 51. Consequently, contact means 25, 26, 27, 28, and 29 are electrically connected to contact 51 and, in addition, contacts 25, 26, 27, 28, and 29 are electrically connected one to the other. The annular ring of conductive liquid is also in engagement with the insulative coating 22 on the pole pieces 15 and 16.

In order to maintain a substantially constant pressure on the conductive liquid 60 and to correct for thermal expansion and contraction a bellows means 90 is provided. Bellows means 90 is connected to passage 23 by a passage 91 through pole piece 15. As shown in FIGURE 1, passage 51 is lined with the insulative adhesive 22 so that the conductive liquid mass element 60 is electrically insulated from pole piece 15.

The structure described thus far, as indicated defines an annular passage 23. The axis of the passage 23 may be considered in turn to define an acceleration sensitive axis (ASA) identified by reference numeral 61. It will be understood that there will be relative movement occurring between the seismic mass 60 and the structure forming or defining the passage 23. More specifically, angular accelerations about the ASA 61 cause relative movement to occur between the seismic mass 60 and a contact means 25, 26, 27, 28, 29, and 51. In other words, relative movement occurs between the seismic mass 60 and the pickoff means 54, between the seismic mass 60 and activation means 80, and also between the seismis mass 60 and the torquer means 55. It should be noted that the magnetic flux field set up across passage 23 is directed perpendicular to the plane of the paper in FIGURE 2 and that the relative movement of seismic mass 60 is directed perpendicular to the direction of the magnetic flux field. In addition, the contacts within the passage 23 forming the pickoff means, activation means, and torquer means are positioned transversely to the direction of the magnetic flux field.

FIGURE 3 shows the schematic representation of the electrical connections of the accelerometer means 10 shown in FIGURES 1 and 2. The pickoff means 54 and the torquer means 55 are schematically illustrated. In addition, the distributed resistance of the seismic mass 60 which electrically connects 25, 26, 27, 28, and 29 to contact 51 and also contacts 25, 26, 27, 28, and 29 each to the other is identified by reference numeral 56. The distributed resistance 56 of the seismic mass 60 in effect can be represented as a T network and is connected between terminals 32, 36, and 52. It will be noted that terminal 52 is connected through lead 53 to ground 62. Terminal 32 of pickoff means 54 is connected through lead 41 to suitable amplifier means 63. The amplifier means 63 is connected by lead 64 to terminal 65 of readout or output means 66. The other terminal of output means 66 is depicted by reference numeral 67 and is connected by lead 70 to terminal 36. Terminal 36 is one terminal of torquer means 55, the other terminal being represented by reference number 52. It is clear therefore that a circuit exists from pickoff means 54, through terminal 32, lead 41, amplifier 63, lead 64, terminal 65, output means 66, terminal 67, lead 70, terminal 36, torquer means 55, terminal 52, and lead 53 to ground 62. The above described circuit is commonly referred to by those skilled in the art as a negative feedback loop.

In the instant invention, a controlled positive feedback loop also exists by virtue of the conducting path through the seismic mass 60. This positive feedback loop is schematically illustrated in FIGURE 3 as existing from terminal 32 through lead 41, amplifier 63, lead 64, terminal 65, output means 66, terminal 67, lead 70, terminal 36, seismic mass 60 (the distributed resistance of which is depicted by reference numeral 56) to terminal 32.

It should be pointed out that there is a distinct difference between the magnetic feedback loop and the controlled positive feedback loop. As previously explained the function of the negative feedback loop is to provide a rebalancing (mechanical) force on seismic mass 60. The function of the controlled positive feedback loop is to provide an additional signal (electrical) of various degrees of magnitude to the torquer means 55. The main advantage of this controlled positive feedback loop is that it results in a greater gain in the external feedback loop. By proper choice of design, it is possible to control the amount of gain in the positive feedback loop. In some embodiments, the amount of gain may be reduced to a negligible amount, in other embodiments there may be a finite amount of gain.

*Operation*

When no angular acceleration is applied to the accelerometer means 10 about the ASA 61 there will be no relative movement (other than the oscillations produced by the activation means 80) between the seismic mass 60 and the elements defining the passage 23. Consequently, there will be no voltage generated across pickoff means 54 (contact means 25 and 51) and therefore there is no output signal ($e_o$) across output means 66 and torquer means 55 (terminals 65 and 52).

Assume now that an angular acceleration (clockwise as viewed in FIGURE 2) is applied to the accelerometer 10 about the ASA 61. This will cause a relative movement between the seismic mass element 60 and the elements which collectively define or form the passage 23. The relative movement of seismic mass 60 occurs about the ASA 61. The relative movement of the seismic mass 60 and the elements defining the passage 23 causes a unidirectional voltage of one sense to be generated across pickoff means 54 (contact means 25 and 51 in this embodiment). The voltage is generated due to the movement of a conductor (seismic mass element 60) moving at right angles to a magnetic flux field as in any conventional generator. The magnitude of the voltage is proportional to $Blv$, where B is the magnetic flux density, $l$ is the conductor length between contact means 25 and 51, and $v$ is the velocity of the seismic mass 60 in the passage 23. The voltage across pickoff means 54 is applied to the amplifier means 63. The output voltage of amplifier means 63 is then applied across output means 66 and torquer means 55. The application of the amplifier output voltage across torquer means 55, that is, contact means 29 and 51 in this embodiment, causes a current to flow, in the case of clockwise accelerations, from contact 29 to contact 51 through seismic mass 60. This current is flowing at right angles to the magnetic flux field across passage 23 and thus a rebalance force is developed, which is applied to seismic mass 60 at right angles to both the direction of the magnetic flux field and the direction of the current, and which tends to oppose the relative movement thereof. The magnitude of the rebalance force is proportional to $BIl$ where B is the magnetic flux density, $l$ is the conductor length between contact means 29 and 51, and I is the current flowing between contact means 29 and 51. Therefore, the voltage $e_o$ across the output means 46 and the torquer means 55 is proportional to the input angular acceleration. It should be pointed out that should the applied angular acceleration be in the opposite direction, that is, counterclockwise, as viewed in FIGURE 2, the voltage generated in the pickoff means 54 would be of the opposite sense and accordingly the torquer means 55 will be energized such that the current flows in the opposite direction (from contact means 51 to contact means 29) so that the rebalancing force is applied to seismic mass 60 in the opposite direction and again tends to oppose the relative movement thereof.

The advantages of the apparatus described are several. The electronics or electrical circuitry required to provide a useful output signal indicative of the applied acceleration are extremely simple in comparison to the complex arrangement presently used in the industry. There is substantially no elastic restraint acting on the seismic mass, the only restraint on the mass being that intentionally produced by the torquer means above explained. There is no force acting on the seismic mass element when it is at its null position, that is, when no angular acceleration is applied. In addition, the present invention has no sensitivity to any linear accelerations and gives an output signal which is indicative only of angular accelerations.

While I have shown and described the specific embodiments of this invention, further modifications and improvements will occur to those skilled in the art. I desire to be understood, therefore, that this invention is not limited to the particular forms shown and I intend in the appended claims to cover all modifications which do not depart from the spirit and scope of this invention.

What I claim is:

1. An angular accelerometer comprising: a hollow container; a source of magnetic flux; a pair of pole pieces, said container, said source of magnetic flux, and said pole pieces being connected together such that said pole pieces are positioned contiguously in a spaced relationship defining an annular gap therebetween, said source of magnetic flux being effective to cause magnetic flux to flow between said pole pieces; a first insulator means; a second insulator means, said first and second insulator means cooperating with said pole pieces to form an annular passage therebetween; first, second, and third contact means being positioned within said passage transversely to the direction of said magnetic flux field, said contact means being electrically insulated from one another, said first and said third contact means forming a first set of contacts and constituting a pickoff means, and said second and said third contact means forming a second set of contacts and constituting a torquer means; means electrically connecting said first and said second sets of contact means; an electrically conductive liquid mass element positioned within said passage, said mass element being effective to electrically connect said first and said third contact means, to electrically connect said second and said third contact means, to electrically connect said first and second contact means, being electrically insulated from said pole pieces, and said mass element being adapted to move relative to said means forming said passage in response to accelerations applied about the axis of said passage; and means for maintaining a constant pressure on said liquid mass element.

2. An angular accelerometer comprising: a hollow container; a source of magnetic flux; a pair of pole pieces, said container, said source of magnetic flux, and said pole pieces being connected together such that said pole pieces are positioned contiguously in a spaced relationship defining an annular gap therebetween, and said source of magnetic flux being effective to cause magnetic flux to flow between said pole pieces; a first insulator means, a second insulator means; said first and second insulator means connected together and cooperating with said pole pieces to form an annular passage therebetween; first, second, and third contact means being positioned within said passage and being electrically insulated from one another, said contact means being spaced transversely to the direction of said magnetic flux field, said first and said third contact means forming a pickoff means, and said second and said third contact means forming a torquer means; means connecting said pickoff means and said torquer means; and an electrically conductive fluid filling said passage, said fluid being effective to electrically connect said first and said third contact means, said second and said third contact means, said first and said second contact means, being electrically insulated from said pole pieces, and being adapted to move relative to said means forming said passage in response to accelerations about the axis of said passage.

3. Motion sensing apparatus comprising: a magnetic core structure including an annular gap therein; magnetic flux producing means associated with said core structure and effective to cause magnetic flux to bridge said gap; means including first, second, and third contact means positioned adjacent to said gap and cooperating therewith to form an annular passage therebetween, said contact means being electrically insulated one from the other, said first and said third contact means forming a pickoff means, and said second and said third contacts forming a torquer means; means connecting said pickoff means and said torquer means; and a conductive fluid filling said passage, said fluid being adapted to move relative to said means forming said passage in response to accelerations applied to said apparatus about the axis of said passage and to electrically connect said first and third contact means and said second and third contact means, said mass element being further adapted to electrically connect said pickoff means and said torquer means.

4. Motion sensing apparatus comprising: a magnetic core structure including an annular gap therein; magnetic flux producing means associated with said core structure and effective to cause magnetic flux to bridge said gap; means including first, second, and third contact means positioned adjacent to said gap and cooperating therewith to form an annular passage therebetween, said contact means being electrically insulated one from the other, said first and said third contact means forming a first set of contacts and constituting a pickoff means, and said second and said third contacts forming a second set of contacts and constituting a torquer means; means electrically connecting said first and said second sets of contacts; and a conductive seismic mass element positioned within and entirely filling said passage, said mass element being adapted to move relative to said means forming said passage in response to accelerations applied to said apparatus about the axis of said passage, and adapted to interconnect said first, said second, and said third contact means.

5. A motion sensing apparatus which comprises a closed annular passage; a magnetic flux producing means associated with said passage and effective to cause magnetic flux to bridge said passage; a pickoff means positioned transversely to the direction of the magnetic flux field and within said passage; a torquer means positioned transversely to the direction of the magnetic flux field and within said passage; an activator means positioned transversely to the direction of the magnetic flux field and within said passage; a source of alternating voltage; means connecting said source of alternating voltage to said activator means; a conductive liquid mass element positioned within said passage and adapted to move relative to said means forming said passage in response to accelerations applied about the axis of said passage, the relative movement of said liquid causing a pickoff voltage to be generated across said pickoff means; an amplifier means; an output means; and means connecting said pickoff means to said amplifier means, the output voltage of said amplifier being applied across said output means and said torquer means, said output voltage being indicative of the applied angular acceleration, and said torquer means being effective to apply a rebalancing force to said mass element tending to oppose the relative movement between said mass element and said means forming said passage.

6. Motion sensing apparatus comprising: a magnetic core structure including an annular gap therein; magnetic flux producing means associated with said core structure and effective to cause magnetic flux to bridge said gap; means including first, second, and third contact means spaced transversely to the direction of said magnetic flux field and being positioned adjacent to said gap and cooperating therewith to form an annular passage therebetween, said contact means being electrically insulated one from the other, said first and said third contact means forming a first set of contacts and constituting a pickoff means, and said second and said third contacts forming a second set of contacts and constituting a torquer means; means electrically connecting said first and said second sets of contacts; and a conductive seismic mass element positioned within and entirely filling said passage, said mass element being adapted to move relative to said means forming said passage in response to accelerations applied to said apparatus about the axis of said passage, and adapted to interconnect said first, said second, and said third contact means.

7. Motion sensing apparatus comprising: a magnetic core structure including an annular gap therein; magnetic flux producing means associated with said core structure and effective to cause magnetic flux to bridge said gap; means including pickoff means, seismic mass activation means, and torquer means positioned adjacent to said gap and cooperating therewith to form an annular passage therebetween; said activation means being adapted to be connected to a source of alternating voltage; and a conductive seismic mass element positioned within said passage, and adapted to move relative to said means forming said passage in response to accelerations applied about the axis of said passage, said activation means functioning to oscillate said mass element in said passage.

8. Motion sensing apparatus comprising: a magnetic core structure including an annular gap therein; magnetic flux producing means associated with said core structure and effective to cause magnetic flux to bridge said gap; means including pickoff means, seismic mass activation means, and torquer means positioned transversely to the direction of said magnetic flux field and adjacent to said gap and cooperating therewith to form an annular passage therebetween; means connecting said pickoff means and said torquer means; said activation means being adapted to be connected to a source of alternating voltage; and a conductive seismic mass element positioned within said passage and adapted to move relative to said means forming said passage in response to accelerations applied about the axis of said passage, said activation means functioning to oscillate said mass element in said passage.

9. A motion sensing apparatus which comprises a closed passage; a magnetic flux producing means associated with said passage and effective to cause magnetic flux to bridge said passage; means including pickoff means, seismic mass activation means, and torquer means positioned within said passage transversely to the direction of said magnetic flux; means connecting said pickoff means and said torquer means; said activation means being adapted to be connected to a source of alternating voltage; and a conductive seismic mass element positioned within said passage and adapted to move relative to said means forming said passage in response to accelerations applied about the axis of said passage, said activation means functioning by interaction between alternating current and magnetic flux in said passage to oscillate said mass element in said passage.

10. An angular accelerometer comprising: a hollow container; a source of magnetic flux, a pair of pole pieces; said container, said source of magnetic flux, and said pole pieces being connected together such that said pole pieces are positioned contiguously in a spaced relationship defining an annular gap therebetween, and said source of magnetic flux being effective to cause magnetic flux to flow between said pole pieces; a first insulator means; a second insulator means; said first and second insulator means being connected together and cooperating with said pole pieces to form an annular passage therebetween; first, second, third, and fourth contact means being positioned within said passage and being electrically insulated from one another, said contact means being spaced transversely to the direction of said magnetic flux field, said first and said fourth contact means forming a pickoff means, said second and said fourth contact means forming a torquer means, and said third and said fourth contact means forming an activation means; means connecting said pickoff means and said torquer means; and an electrically conductive fluid filling said passage, said fluid being effective to electrically connect said first and said fourth contact means, said second and said fourth contact means, said third and said fourth contact means, and said first, second, and third contact means, said fluid being electrically insulated from said pole pieces and adapted to move relative to said means forming said passage in response to accelerations about the axis of said passage, and said activation means functioning by interaction between current and magnetic flux in said passage to oscillate said fluid in said passage.

11. Motion sensing apparatus comprising: a magnetic core structure including an annular gap therein; magnetic flux producing means associated with said core structure and effective to cause magnetic flux to bridge said gap; means including first, second, third, and fourth contact means positioned adjacent to said gap and cooperating therewith to form an annular passage therebetween, said contact means being electrically insulated one from the other, said first and said fourth contact means forming pickoff means, said second and said fourth contact means forming a torquer means, said third and said fourth contact means forming an activation means; means connecting said pickoff means and said torquer means; and a conductive fluid filling said passage, said fluid being adapted to move relative to said means forming said passage in response to accelerations applied to said apparatus about the axis of said passage, and adapted to electrically connect said first and fourth contact means, said second and fourth contact means, said third and fourth contact means, said mass element being further adapted to electrically connect said pickoff means, said torquer means, and said activation means, and said activation means functioning by interaction between current and magnetic flux in said passage to oscillate said fluid in said passage.

12. An angular, force rebalance accelerometer comprising: magnetic core structure having an annular gap therein; magnetic flux producing means effective to cause magnetic flux to bridge said gap; pickoff contact means and torquer contact means positioned adjacent to said gap and transversely to the direction of said magnetic flux; means including said pickoff contact means and said torquer contact means positioned adjacent to said gap and cooperating therewith to form an annular passage; means including amplifier means electrically connecting said pickoff contact means and said torquer contact means; and conductive fluid seismic mass means positioned within said passage, said seismic mass means being displaced relative to said means forming said passage in response to accelerations applied about the axis of said annular passage, the relative displacement of said seismic mass means being effective to generate a signal in said pickoff contact means which is indicative of the applied acceleration, said torquer contact means being effective to apply a rebalance voltage indicative of said signal to said seismic mass means so as to apply a rebalance force upon said seismic mass means as a result of the interaction between said magnetic flux in said passage and the current flowing between said torquer contact means through said seismic mass means, said rebalance force tending to oppose the relative displacement of said seismic mass means.

13. An angular, force rebalance accelerometer which comprises means defining a closed annular passage; magnetic flux producing means effective to cause magnetic flux to bridge said passage; said means defining said passage including pickoff contact means and torquer contact means positioned transversely to the direction of said magnetic flux; means including amplifier means electrically connecting said pickoff contact means and said torquer contact means; and conductive fluid seismic mass means positioned within said passage, said seismic mass means being displaced relative to said means forming said passage in response to accelerations applied about the axis of said annular passage, the relative displacement of said seismic mass means being effective to generate a signal in said pickoff contact means which is indicative of the applied acceleration, said torquer contact means being effective to apply a voltage across said seismic mass means that is a function of said signal so as to apply a rebalance force thereto, said rebalance force resulting from the interaction between said magnetic flux in said passage and the current flowing between said torquer contact means and through said seismic mass means.

References Cited by the Examiner
UNITED STATES PATENTS

| | | | |
|---|---|---|---|
| 2,753,469 | 7/56 | Statham et al. | 73—516 X |
| 2,856,142 | 10/58 | Haviland | 74—5.7 X |
| 2,942,476 | 6/60 | Turner | 73—517 |

RICHARD C. QUEISSER, *Primary Examiner.*

SAMUEL BOYD, A. M. HORTON, A. BLUM, JOSEPH STRIZAK, *Examiners.*